June 29, 1943.                G. L. DORLAND                2,322,926
                              ASPARAGUS CUTTER
                           Filed Aug. 22, 1941             2 Sheets-Sheet 2
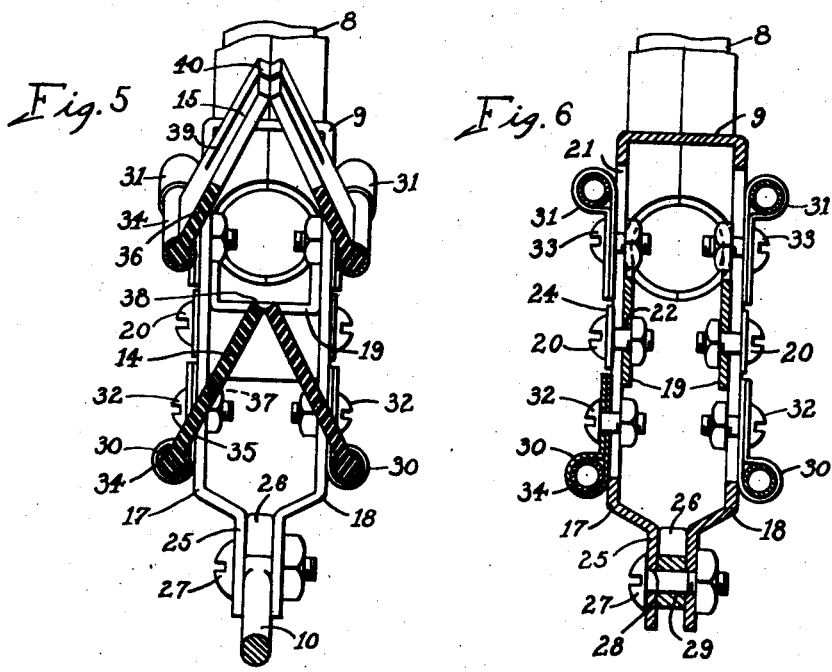
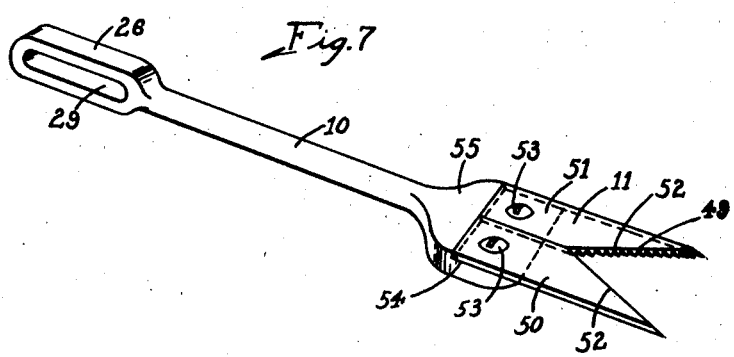
Inventor.
Gordon L. Dorland
By
McCanna, Wintercorn & Morsbach
Attys.

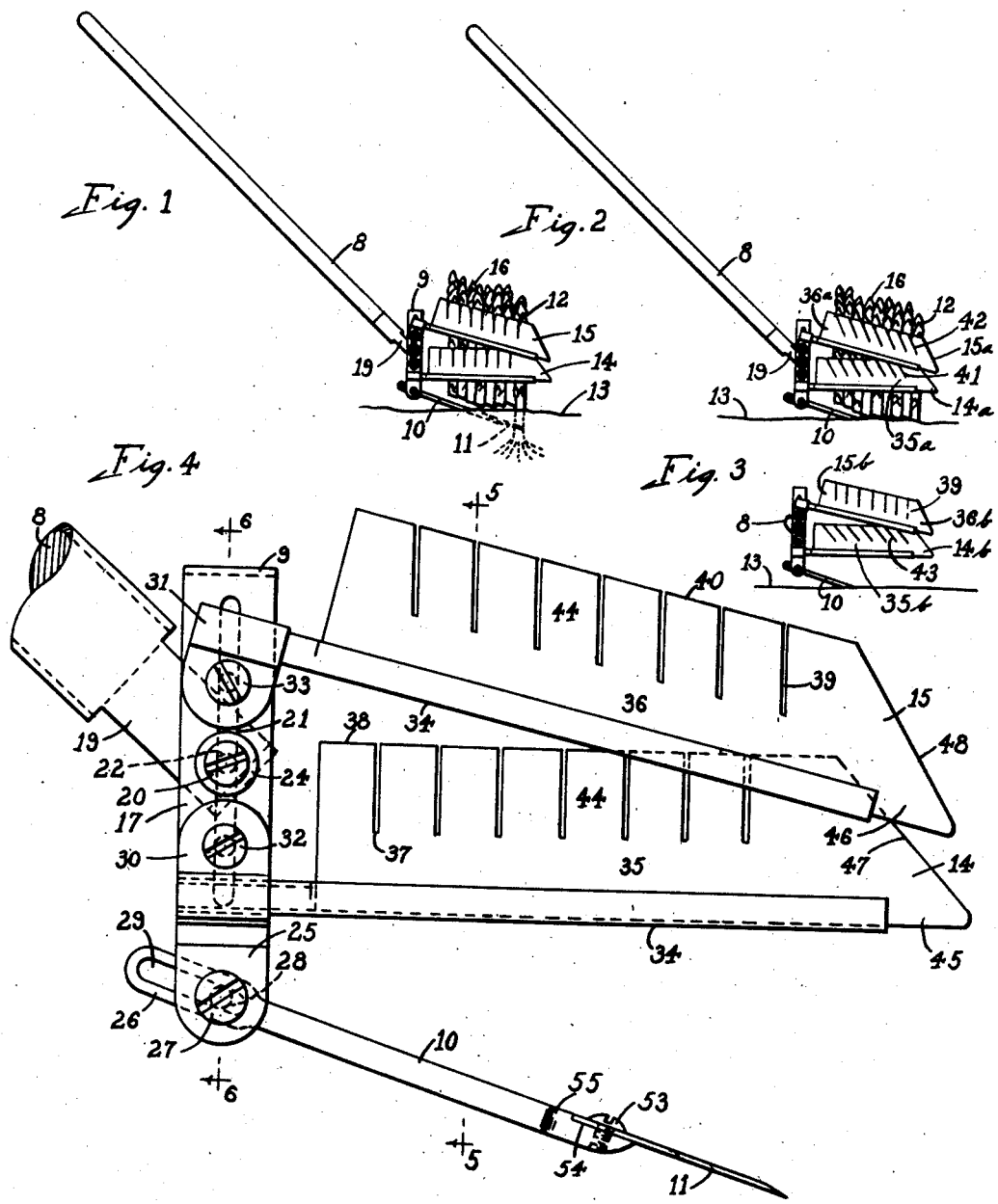

Patented June 29, 1943

2,322,926

UNITED STATES PATENT OFFICE 2,322,926

ASPARAGUS CUTTER

Gordon L. Dorland, Ashton, Ill.

Application August 22, 1941, Serial No. 407,885

20 Claims. (Cl. 30—124)

This invention relates to a new and improved device for cutting asparagus in the field.

The old method of cutting asparagus by hand with a knife is not only slow but extremely tedious work, because of the stooping involved. It is, therefore, the principal object of my invention to provide an asparagus cutter on a handle that is long enough to permit the operation to be performed with the operator substantially erect, the device being so designed that the stalks are cut just below the surface of the ground, so as to leave no stubble to interfere with subsequent cutting of neighboring stalks, and being further designed to retain the cut stalks so that the operator does not have to raise the cutter for the removal of each separate stalk but can remove them a group at a time and place them in a basket provided for that purpose.

A salient feature of the asparagus cutter of my invention consists in the provision of elongated yieldable jaw members, between which the standing stalk is first engaged before the V-shaped knife on the bottom of the device cuts the stalk below the surface of the ground, each stalk as it is cut being thus retained and being moved to the rear between the yieldable jaw members by subsequent stalks until there are enough stalks to substantially fill the jaw members and make it worth while for the operator to stop long enough to raise the cutter and remove the stalks. The knife is in accordance with the invention adjustable endwise relative to the jaw members to suit the operator, it being contemplated that an inexperienced operator will want the knife set back farther in relation to the intake end of the jaw members to insure a better hold on the stalks preliminary to the cutting thereof.

Another object consists in the provision of a device of the kind mentioned in which there are two pairs of jaw members in vertically spaced relation, vertically adjustable relative to one another to permit adjustment according to the average height of the stalks to be cut. The knife in accordance with my invention is also preferably adjustable up and down in relation to the jaw members in addition to its endwise adjustability previously mentioned, whereby to further adapt it to the particular field conditions and the preferences of the operator. The spacing of the knife below the jaw members permits the cutting of stalks that have gone to seed, without taking hold of these stalks between the jaw members, the cutter being merely turned slightly on a horizontal axis to permit use of the knife independently of the jaw members.

Still another object consists in the provision of jaw members defined by upwardly and inwardly converging strips of rubber, which while readily yieldable laterally to permit entry of the stalks nevertheless resist any downward pull although permitting easy upward pull on the stalks, so that the stalks are held securely against dropping out but may be easily withdrawn by the operator. The rubber strips are slit at longitudinally spaced points downwardly from the upper edges, so as to define independently yieldable jaw sections and permit the secure holding of stalks of smaller section next to stalks of larger section. The slitting of the strips on the one pair of jaw members is preferably in staggered relationship to the slitting of the strips on the other pair of jaw members to further insure secure holding of stalks. I may have the slits in the strips of one or both pairs of jaw members inclined rearwardly to facilitate the movement of the cut stalks to the rear. The strips preferably have their front ends projecting well beyond the holders and cut on a bias, so that a V-shaped entrance or inlet is provided between the strips for easy entrance of the standing stalk, the entrance portions being furthermore relatively more easily yieldable so as not to break off neighboring stalks that may be brushed against by these portions in the operation of the cutter.

The invention is illustrated in the accompanying drawings, in which—

Figure 1 is a side view of an asparagus cutter made in accordance with my invention and illustrated as it appears in actual operation;

Fig. 2 is a similar view of another cutter of modified or alternative construction;

Fig. 3 is a side view of the lower end portion of still another cutter of a further modified or alternative construction;

Fig. 4 is a side view, approximately full size, of all but the handle of the cutter shown in Fig. 1;

Figs. 5 and 6 are vertical cross-sections on the correspondingly numbered lines of Fig. 4, and Fig. 7 is a perspective view of the specially constructed knife and its supporting arm.

Similar reference numerals are applied to corresponding parts throughout the views.

Referring first to Fig. 1, the reference numeral 8 designates the handle, on the lower end of which is a frame 9. The frame carries an arm 10 on which a knife 11 is provided to cut stalks of asparagus, like the stalk shown at 12, slightly below the surface of the ground, indicated at 13. The stalk about to be cut is first entered between a lower pair of yieldable jaw members 14 and an upper pair of yieldable jaw members 15, so that the stalk at the time of cutting is properly supported and after cutting is retained in the device and will not drop out accidentally. The yieldable jaw members 14 and 15 can accommodate upwards of six stalks, depending of course upon their size in cross-section, as indicated at 16, the cut stalks accumulating as one after another standing stalk is entered between the jaw members preparatory to cutting it, thereby crowding the previously cut stalks to the rear as shown. The operator will from time to time stop just long enough to raise the cutter and remove the cut stalks and place them in a basket or other receptacle usually carried by the operator for that purpose. The fact that the knife 11 cuts the stalks below the surface of the ground is important, because there is no stubble left to interfere with the subsequent cutting of neighboring stalks when they attain proper height. This cutter greatly facilitates the work and most operators with little or no experience can easily out-distance experienced workmen cutting asparagus by hand with a knife in the old way, especially because of the time gained in not having to stoop over. It is estimated that the average workman working with this handy cutter can easily cut from 30% to 50% more asparagus per hour than the average workman using the old method, and working with this cutter is obviously far less fatiguing. With this cutter the operator never has to stoop, not even for cutting stalks that have gone to seed. Seedy stalks can be quickly cut and thrown aside into the furrow, using the knife 11 alone, that is to say, by turning the handle 8 so that the cutter is turned through a small angle, just enough to allow the knife to cut the seedy stalk in generally the same way as other stalks but without entering the stalk in the jaw members. The jaw members, as will soon appear, have yieldable lips of rubber so that they open readily enough and cannot therefore damage the stalks, although the stalks are held in such a way that there is little or no likelihood of even the slenderest stalks dropping out after they have been cut and before they can be retrieved by the operator.

Referring now to Figs. 4 to 7, the frame 9 is of inverted generally U-shaped sheet metal construction so as to provide opposed side walls 17 and 18, between which a generally U-shaped sheet metal bracket 19, that is suitably secured on the lower end of the handle 8, is entered and pivotally adjustably secured by means of two bolts 20 entered through registering vertical slots 21 provided in said side walls and through holes 22 provided in the side walls of the bracket 19. The outer sides of the bracket 19 are suitably knurled so as to take hold firmly on the inner sides of the walls 17 and 18 when the bolts 20 are tightened, and thus avoid having the handle turn out of adjusted relationship to the frame. The washers 24 under the heads of the bolts provide good bearings for said heads regardless of the slots 21. The lower ends 25 of the walls 17 and 18 are bent into inwardly offset relation to the upper portions of said walls to receive therebetween the longitudinally slotted end 26 of the arm 10, and a bolt 27 is entered through holes 28 in the ends 25 and through the slot 29 in the arm 10 for the adjustable support of the arm for either pivotal or endwise adjustment relative to the frame 9. Sheet metal brackets 30 and 31 are applied to the outer sides of the walls 17 and 18 and clamped by means of bolts 32 and 33, respectively, for support of the pairs of jaw members 14 and 15, respectively. The bolts 32 and 33 are entered through the slots 21 and in that way the brackets 30 and 31 are vertically and pivotally adjustable relative to the frame 9. The pivotal adjustment of the handle 8 is to adapt the cutter to operators of different height. The pivotal and endwise adjustability of the arm 10 is for the purpose of locating the knife 11 not only in the proper vertical spaced relationship to the jaw members 14 and 15, according to the average height of the stalks to be cut, but also in the proper rearwardly spaced relation to said jaw members, so that the stalks will be entered between the jaw members just far enough to insure a good hold before the knife is thrust through the lower end of the stalk just below the surface of the ground. The vertical and pivotal adjustability of the jaw members is desirable so that the device may be adjusted to suit different heights of stalks to be cut. The inner sides of the brackets 30 and 31 are preferably knurled, similarly as the outer sides of the bracket 19, so that the brackets will not tend to get out of adjustment. The upper pair of jaw members 15 is preferably inclined downwardly so that the jaw members 14 and 15 are fairly close together at their front ends but farther apart at their rear ends. This inclination of the upper pair of jaw members 15 has a tendency to cause the cut stalks to be raised more and more as they are crowded more and more to the rear, thus assuring greater clearance with respect to the ground and avoiding rubbing the cut ends on the arm 10, substantially as indicated in Fig. 1.

The jaw members 14 and 15 are of generally similar construction, each pair of jaw members having tubular holders 34 slotted longitudinally to receive the edge portions of rubber strips 35 and 36. The strips 35 in the jaw members 14 are slit vertically, as at 37, substantially at right angles to the free edges 38 at regularly spaced intervals. The strips 36 are slit vertically, as indicated at 39, at an oblique angle to the free edges 40, with the slits 39 staggered relative to but in substantially the same space relationship as the slits 37, as clearly indicated in Figs. 1 and 4. This staggered or offset relationship of the slits, as will soon appear, is to insure more secure gripping of the stalks than might be obtainable with the slits in alignment. With the present arrangement if one portion of a stalk is adjacent the slits in the strips 36, such a stalk will invariably be between the slits in the strips 35, and in that way a good hold is assured at all times. Substantially the same effect is obtainable with a construction like that shown in Fig. 2, where the rearwardly inclined slits 41 in the strips 35a of the lower pair of jaw members 14a are in staggered relationship to the rearwardly inclined slits 42 in the strips 36a of the upper pair of jaw members 15a, or by having vertical slits 39 in the strips 36b of the upper jaw members 15b in vertical alignment with rearwardly inclined slits 43 in the strips 35b of the lower pair of jaw members 14b. In all of these constructions the rubber strips for each pair of jaws are set in upwardly converging relationship, as shown in Fig. 5, with their upper free edge portions normally in contact with one another or at least in closely spaced relation. In that way it should be obvious that a stalk of asparagus disposed between the strips can be easily withdrawn upwardly but the strips will very definitely resist any downward movement and there is, therefore, no danger of a cut stalk dropping out. The parallel slitting at closely spaced intervals makes the tongues 44 between the slits more or less independently flexible, so that a thick stalk next to a slender stalk is not so apt to interfere with the secure holding of the slender stalk as might otherwise be the case. The front end portions 45 and 46 of the strips 35 and 36 project for a short distance beyond the front ends of the holders 34 and the front ends of the strips are cut on a bias, as indicated at 47 and 48, so that the strips 35 define a V-shaped entrance in vertical alignment with a similar V-shaped entrance defined by the strips 36, thus greatly facilitating the entry of a standing stalk between the yieldable jaws preliminary to the cutting of the stalk by the knife 11. The extent to which the entrance end portions of the strips project beyond the holders 34 also insures additional yieldability, so that a neighboring standing stalk that may be brushed against in the operation of cutting another stalk is not so apt to be damaged, because the free end portions of the strips will yield enough to eliminate likelihood of breaking off the stalk unintentionally. The rearward inclination of the slits 41, 42, and 43 is of advantage from the standpoint of easier spreading of the strips by the stalks, there being no square shoulders presented by the undistended portions to impede the rearward movement of the stalks as they are crowded back between the strips in the jaws. The rearward and upward inclination of the slits also tends to move the stalks upwardly as they are crowded to the rear, thus facilitating withdrawal of the cut stalks from the cutter.

The knife 11 has a V-shaped cutting edge 49, as indicated in Fig. 7, thus facilitating the cutting of the stalks just below the surface of the ground, the stalks being guided into the V and cut off as the knife is thrust forward. While I may provide a one-piece V-shaped blade either integral with or secured upon the end of the arm 10, I prefer to provide a blade made up of two pieces 50 and 51 each with a tapered end 52 to define one side of the V-shaped cutting edge 49, the two pieces being secured each by a single screw 53 onto a seat 54 provided therefor on the widened end portion 55 of the arm 10. This permits replacement of the knife sections at low cost when they become worn. The cutting edge 49 is preferably serrated as shown. By making the knife 11 in two parts that are easily replaced, there is eliminated the necessity for frequent sharpening. In passing, it will, of course, be understood that the V-shaped cutting edge 49 is disposed approximately in vertical alignment with the yieldable jaw members 14 and 15, as indicated in Fig. 5. Despite this vertical alignment the operator will find it easy to use the knife 11 in cutting stalks that have gone to seed, there being sufficient spacing of the knife 11 with respect to the lower pair of jaw members 14 so that the operator can direct the knife toward the stalk with the jaw members 14 and 15 held out of the way of the stalk.

It is believed the foregoing description conveys a good understanding of the objects and advantages of my invention. The appended claims have been drawn with a view to covering all legitimate modifications and adaptations.

I claim:

1. A device of the class described, comprising an elongated handle, yieldable jaws mounted on one end thereof opening forwardly relative to the handle, and a knife mounted on the same end of the handle with the jaws below the latter so that it is adapted for cutting through an object after the same has been engaged between the jaws.

2. A device of the class described, comprising an elongated handle, yieldable jaws mounted on one end thereof opening forwardly relative to the handle, and a knife mounted on the same end of the handle with the jaws below the latter so that it is adapted for cutting through an object after the same has been engaged between the jaws, said jaws extending substantially horizontally with their front ends in a predetermined forwardly spaced relation to the cutting edge of the knife, the knife being inclined forwardly and downwardly relative to the jaws and terminating in a cutting edge.

3. A device of the class described, comprising an elongated handle, yieldable jaws mounted on one end thereof opening forwardly relative to the handle, and a knife mounted on the same end of the handle with the jaws below the latter so that it is adapted for cutting through an object after the same has been engaged between the jaws, said jaws being of elongated form and disposed substantially horizontally reaching forwardly from the handle, the knife reaching forwardly substantially horizontally from the handle beneath said jaws and terminating in a cutting edge, the rearward portion of the jaws being adapted to retain objects after they have been cut by the knife.

4. A device of the class described, comprising a vertical frame, pairs of yieldable jaw members mounted on said frame in vertically spaced relation and extending substantially horizontally forwardly from the frame, an elongated handle having one end attached to said frame, the handle extending rearwardly from the frame, and a knife mounted on the lower end portion of the frame and extending forwardly therefrom and terminating in a cutting edge in a predetermined rearwardly spaced relation to the front end of said jaw members.

5. A device as set forth in claim 4, wherein the pairs of jaw members are adjustable vertically relative to the frame and relative to one another.

6. A device as set forth in claim 4, wherein the pairs of jaw members are adjustable vertically relative to the frame and relative to one another, and wherein the knife is adjustable endwise transversely relative to the frame.

7. A device as set forth in claim 4, wherein the pairs of jaw members are adjustable vertically relative to the frame and relative to one another, and wherein the knife is adjustable endwise transversely relative to the frame and is also adjustable angularly with respect to said frame.

8. A device as set forth in claim 4, wherein the handle has the end thereof adjustable angularly with respect to said frame.

9. A device as set forth in claim 4, wherein the handle has the end thereof adjustable angularly with respect to said frame, said handle being also adjustable vertically relative to said frame.

10. A device of the class described, comprising, in combination, a pair of jaw members adapted to receive therebetween an object to be held while it is being severed, said jaw members including upwardly and inwardly converging yielding lips, whereby to hold the object yieldingly and resist downward movement more than upward movement of the object endwise transversely relative to the lips, a handle for supporting and guiding said jaw members to engage the lips on opposite sides of an object to be severed, and cutting means also carried on the handle below the jaw members to sever the object after engagement thereof between the lips.

11. A device as set forth in claim 10, wherein the lips of said jaw members are defined by elongated strips of sheet rubber, the jaw members being elongated for support of the strips along one longitudinal edge portion.

12. A device as set forth in claim 10, wherein the lips of said jaw members are defined by elongated strips of sheet rubber, the jaw members being elongated for support of the strips along one longitudinal edge portion, the strips having their front ends cut on a bias so as to define a V-shaped entrance between the lips.

13. A device as set forth in claim 10, wherein the lips of said jaw members are defined by elongated strips of sheet rubber, the jaw members being elongated for support of the strips along one longitudinal edge portion, the strips having their front ends cut on a bias so as to define a V-shaped entrance between the lips, the front end portions of the strips projecting forwardly appreciably from the jaw members for greater yieldability of these portions.

14. A device as set forth in claim 10, wherein the lips of said jaw members are defined by elongated strips of sheet rubber, the jaw members being elongated for support of the strips along one longitudinal edge portion, the strips being slit downwardly from the free upper longitudinal edge thereof at longitudinally spaced points so as to define separate tongue portions more or less independently flexible.

15. A device as set forth in claim 10, wherein the lips of said jaw members are defined by elongated strips of sheet rubber, the jaw members being elongated for support of the strips along one longitudinal edge portion, the strips being slit downwardly from the free upper longitudinal edge thereof at longitudinally spaced points so as to define separate tongue portions more or less independently flexible, the slits extending forwardly and downwardly substantially in parallelism to one another for the purpose described.

16. A yieldable work-holding jaw for an asparagus cutter or the like, comprising a substantially rigid elongated support and a strip of flexible resilient sheet material mounted by one longitudinal edge portion on said support.

17. A yieldable work-holding jaw for an asparagus cutter or the like, comprising a substantially rigid elongated support and a strip of flexible resilient sheet material mounted by one longitudinal edge portion on said support, said strip having one end thereof cut on a bias and having substantially parallel slits provided therein in longitudinally space relation along the free longitudinal edge portion extending inwardly from the longitudinal edge of the strip.

18. A yieldable work-holding jaw for an asparagus cutter or the like, comprising a substantially rigid elongated support and a strip of flexible resilient sheet material mounted by one longitudinal edge portion on said support, said strip having one end thereof cut on a bias and having substantially parallel slits provided therein in longitudinally spaced relation along the free longitudinal edge portion, the slits extending inwardly from the longitudinal edge of the strip in the general direction of the biased end at an oblique angle with respect to the longitudinal edge of the strip.

19. A yieldable work-holding jaw for an asparagus cutter or the like, comprising a substantially rigid elongated support and a strip of flexible resilient sheet material mounted by one longitudinal edge portion on said support, said strip having slits provided therein in longitudinally spaced relation along the free longitudinal edge portion, extending inwardly from the longitudinal edge of the strip.

20. A yieldable work-holding jaw for an asparagus cutter or the like, comprising a substantially rigid elongated support and a strip of flexible resilient sheet material mounted by one longitudinal edge portion on said support, said strip having the front end thereof cut on a bias, the front end portion of the strip projecting forwardly appreciably from the support for greater yieldability of said front end portion.

GORDON L. DORLAND.